United States Patent
van Bekkum et al.

(10) Patent No.: US 6,189,389 B1
(45) Date of Patent: Feb. 20, 2001

(54) ULTRASONIC FLOWMETER

(75) Inventors: Jan Aart van Bekkum, Hoornaar; Vladimir Smychliaev, Dordrecht, both of (NL)

(73) Assignee: Krohne A.G. (CH)

( * ) Notice: Under 35 U.S.C. 154(b), the term of this patent shall be extended for 0 days.

(21) Appl. No.: 09/552,047

(22) Filed: Apr. 19, 2000

Related U.S. Application Data

(62) Continuation of application No. 09/059,217, filed on Apr. 13, 1998, now abandoned, which is a continuation-in-part of application No. 09/011,101, filed as application No. PCT/EP97/02784 on May 28, 1997, now abandoned.

(51) Int. Cl.[7] .................................................. G01F 1/20
(52) U.S. Cl. ........................................................ 73/861.18
(58) Field of Search ............................ 73/861.18, 861.19, 73/861.26, 861.27, 861.28, 861.29, 170.13

(56) References Cited

U.S. PATENT DOCUMENTS

| | | | |
|---|---|---|---|
| 3,906,791 | 9/1975 | Lynnworth | 73/194 |
| 4,004,461 | 1/1977 | Lynnworth | 73/194 |
| 4,173,889 | * 11/1979 | Forster et al. | 73/861.27 |
| 4,375,767 | 3/1983 | Magori | 73/861 |
| 4,646,575 | 3/1987 | O'Hair et al. | 73/861 |
| 5,243,863 | 9/1993 | Gill | 73/861 |
| 5,419,326 | 5/1995 | Harnoncourt | 128/660 |
| 5,531,124 | 7/1996 | Kim et al. | 73/861 |

OTHER PUBLICATIONS

Patents Abstracts of Japan P–426, Feb. 5, 1986, vol. 10/No. 30 Kaoru Machida.

* cited by examiner

*Primary Examiner*—Harshad Patel
(74) *Attorney, Agent, or Firm*—Cesari and McKenna

(57) ABSTRACT

An ultrasonic flowmeter for flowing media, has a measuring tube and at least one ultrasonic transducer, the ultrasonic transducer being installed in contact with the flowing medium in a transducer pocket of the measuring tube. The flowmeter eliminates the disadvantages and problems present in the known ultrasonic flowmeters, caused by eddies generated by the transducer pocket, by providing the transducer pocket with a grid having a mesh, in which the grid is located at the entrance side of the transducer pocket.

7 Claims, 2 Drawing Sheets

ULTRASONIC FLOWMETER

RELATED APPLICATION

This application is a continuation of Ser. No. 09/059,217 filed Apr. 13, 1998 now abandoned, which is a continuation-in-part of Ser. No. 09/011,101 filed Jun. 12, 1998 now abandoned, which is a 371 of PCT/EP97/02784 filed May 28, 1997.

FIELD OF THE INVENTION

The invention concerns an ultrasonic flowmeter for flowing media, with a measuring tube and with at least one ultrasonic transducer, the ultrasonic transducer being installed with contact with the flowing medium in transducer pockets of the measuring tube.

BACKGROUND OF THE INVENTION

The use of ultrasonic flowmeters has acquired increasing significance in the case of industrial flow measurement of liquids and gases, collectively referred to herein as flowing media. The flow measurement takes place—as in the case of magnetic inductive flowmeters—"contactlessly", that is, without disturbing parts installed in the flow, which always result in eddy formation and a high pressure loss.

In the case of ultrasonic flowmeters, with respect to the measuring process, in the first place there are the delay process and the Doppler process. In the case of the delay process, there are the direct delay difference process, the pulse recurrence frequency process, and the phase shift process (cf. H. Bernard "Ultraschall-Durchflußmessung" in "Sensoren Meßaufnehmer", published by Bonfig/Bartz/Wolff in the expert verlag, further the VDI/VDE GUIDE-LINE 2642 "Ultraschall-Durchflußmessung von Fl üssigkeiten in voll durchströmten Rohrleitungen").

It is functionally necessary for ultrasonic flowmeters of the type under discussion, on the one hand, to have a measuring tube which as a rule represents the measuring section together with an entrance section and an exit section, and, on the other hand, at least one ultrasonic transducer called a measuring head. In this case, "ultrasonic transducer" is to be understood very generally. In the first place, on the one hand, ultrasonic transducer includes ultrasonic transmitters, therefore measuring heads for generating and for radiating ultrasonic signals, and on the other hand, ultrasonic receivers, therefore measuring heads for receiving ultrasonic signals and for converting the ultrasonic signals received into electrical signals. However, ultrasonic transducer also includes measuring heads which combine ultrasonic transmitters and ultrasonic receivers, which therefore serve both for generating and radiating ultrasonic signals, as well as for receiving ultrasonic signals and converting the ultrasonic signals received into electrical signals.

An ultrasonic transducer or measuring head of the type described last is used in ultrasonic flowmeters for flowing media, which work with only one ultrasonic transducer. Such ultrasonic flowmeters determine the velocity of the flowing medium with the help of the Doppler delay of the ultrasonic signal reflected at an inhomogeneity of the flowing medium. It is likewise conceivable, that the Doppler delay of the ultrasonic signals is determinable by two ultrasonic transducers, which are installed on opposite sides of the measuring tube without offset with respect to one another. Measurements based on the delay process are possible as well, in which two ultrasonic transducers are installed on the same side of the measuring tube arranged offset in the direction of flow, in which in this case the ultrasonic signals are reflected at the side of the measuring tube facing the ultrasonic transducers. Normally however two ultrasonic transducers are provided which are arranged on opposite sides of the measuring tube offset with respect to one another in the direction of flow. In the following, the invention is described with respect to the last explained type of ultrasonic flowmeter, without limitation to this type.

There exist on the one hand ultrasonic flowmeters, whose ultrasonic transducers do not have contact with the flowing medium, therefore being attached to the measuring tube from outside, the so called "clamp-on-arrangement". On the other hand there exist ultrasonic flowmeters, whose ultrasonic transducers have contact with the flowing medium. The invention relates only to such ultrasonic flowmeters whose ultrasonic transducers have contact with the flowing medium.

At the outset, it was said, in the case of the ultrasonic flowmeters under consideration, the ultrasonic transducers are installed in transducer pockets of the measuring tube. A transducer pocket here means a recess or hollow lying outside the flow cross-section of the measuring tube, however realized, in which an ultrasonic transducer is installed so that it does not project into the flow cross-section of the measuring tube, and therefore actually does not influence the flow. Since the ultrasonic transducers are arranged offset with respect to one another in the direction of flow, but also aligned with one another, as a rule the longitudinal axis of the transducer pockets runs at an acute angle or at an obtuse angle to the direction of flow of the flowing medium or to the longitudinal axis of the measuring tube (cf. Fig. 6.1.1 on page 532 of the reference "Sensoren Meßaufnehmer", loc. cit., Fig. 8 on page 18 of the VDI/VDE-GUIDELINE 2642 "Ultraschall-Durchflußmessung von Flüssigkeiten in voll durchströmten Rohrleitungen", and Fig. 2-2 on page 212 of the reference "Ultrasonic Measurement for Process Control" by Lawrence C. Lynnworth, ACADEMIC PRESS, INC., published by Harcourt Brace Jovanovich).

In the case of ultrasonic flowmeters, the transducer pockets influence the flow of the medium flowing in the measuring tube; in particular, eddies are generated, having the frequency $$n = S \frac{V}{D}$$

where
  S=Strouhal number,
  V=speed of the flowing medium,
  D=size of the transducer pocket.

The publication "Boundary-Layer Theory" by Dr. Hermann Schlichting, McGRAW-HILL BOOK COMPANY, is to be consulted here.

The following examination shows the effect of the eddies generated by the transducer pockets:

The Strouhal number is around 0.2 and changes little when the Reynolds number is between $2 \times 10^2$ and $6 \times 10^5$ (cf. Fig. 2.9 on page 32 of the reference "Boundary-Layer Theory", loc. cit.). Normally, piezo-electric ultrasonic transducers are used which have a diameter of 10 to 20 mm, that is, the size of the hollow lies between 15 and 40 mm. In the case of speeds of the flowing medium between 0.5 and 10 m/s, the frequency of the eddies generated by the transducer pockets is between 2.5 and 133 Hz. Now if measurement is to be performed with an accuracy of 0.1%, then the time constant is between around 3.8 s and around 200 s. The dynamics of the ultrasonic flowmeters under consideration therefore is poor.

In order to solve the problem presented previously in detail, which results from the eddies generated by the transducer pockets, it has already been proposed that the transducer pockets be filled with plastic (cf. FIG. 4-9 on page 257 of the reference "Ultrasonic Measurements for Process Control", loc. cit.). However, in this case the same disadvantages resulting from Snell's law appear as in the case of ultrasonic flowmeters in which the ultrasonic transducers are attached to the measuring tube from the outside, therefore in the case of the so-called "clamp-on arrangement". In addition, there are problems with the acoustic impedance and technological problems with the plastic filling the transducer pockets, particularly at higher temperatures. The disadvantages and problems connected with filling the transducer pockets with plastic are the reason why this design has not been used in practice.

SUMMARY OF THE INVENTION

The object of the invention now is to design and further develop the known ultrasonic flowmeters, on which the invention is based, so that eddies generated by the transducer pockets do not have the disadvantageous effect described.

The ultrasonic flowmeter in accordance with the invention, where the problem previously presented is solved is essentially characterized by the fact that the transducer pockets are each provided with a grid having meshes in which the grid is located at the entrance side of the transducer pocket. Entrance side means here that the grid is provided where the transducer pockets begin, as seen from the measuring tube. The grids provided in accordance with the invention are functionally necessary only in the respective entrance area of the transducer pockets. However, it may be advantageous to provide the inside of the measuring tube as a whole with a continuous grid. Then the measuring tube as a whole has a uniform roughness, by means of which the flow curve and thus the measurement result are stabilized.

The grid, the meshes of which naturally have to be ultrasonically transparent, provided at least at the entrance of each transducer pocket in accordance with the invention, on the one hand leads to a reduction of the eddies and, on the other hand, to an increase in the frequency of the eddies still appearing. Since, as described initially, the frequency of the eddies generated is proportional to the Strouhal number and the speed of the flowing medium, but is inversely proportional to the effective cross-section in particular, it becomes immediately understandable that when the effective cross-section of the meshes is around a tenth of the effective cross-section of the transducer pockets, the frequency of the generated eddies is ten-fold. Furthermore, since now, as also initially presented, the time constant is inversely proportional to the frequency of the generated eddy, the time constant is reduced to a tenth, therefore to around 0.4 to 20 seconds for the example presented initially.

It was indicated previously that the grids in accordance with the invention naturally have to be ultrasonically transparent. This is assured when the meshes of the grid have mesh or braid bars which are smaller or shorter than the product of the square root of the average depth of the transducer pockets and the wavelength $\lambda$ of the ultrasound in the flowing medium.

In particular, there are now a number of possibilities for designing and further developing the ultrasonic flowmeter in accordance with the invention; in particular this obtains with respect to the geometry of the meshes of the grid provided in accordance with the invention. The dependent patent claims, on the one hand, and the description of preferred embodiments in connection with the drawing, on the other hand, are to be consulted here.

DETAILED DESCRIPTION OF ILLUSTRATIVE EMBODIMENTS

The ultrasonic flowmeters shown in FIGS. 1 to 4 are specified for flowing media, in particular for liquids, but also for gases. The speed of the flowing medium can be measured by means of the ultrasonic flowmeters under consideration. The flow can be determined from the measured speed and the known flow cross-section.

The ultrasonic flowmeters shown in FIGS. 1 to 4 basically consist of a measuring tube 1 and at least one ultrasonic transducers 2. In the embodiments shown in each case, two ultrasonic transducers 2 are provided offset with respect to one another in the direction of flow; the following explanation of the invention naturally also is directly applicable to ultrasonic flowmeters in which more than two ultrasonic transducers 2 are provided.

As FIGS. 1 to 4 show, the ultrasonic transducers 2 are installed with contact with the flowing medium in the transducer pockets 3 of the measuring tube 1. In all embodiments shown, the longitudinal axis of the transducer pockets 3 runs at an acute angle or at an obtuse angle to the direction of flow or to the longitudinal axis of the measuring tube 1.

Figure 1:
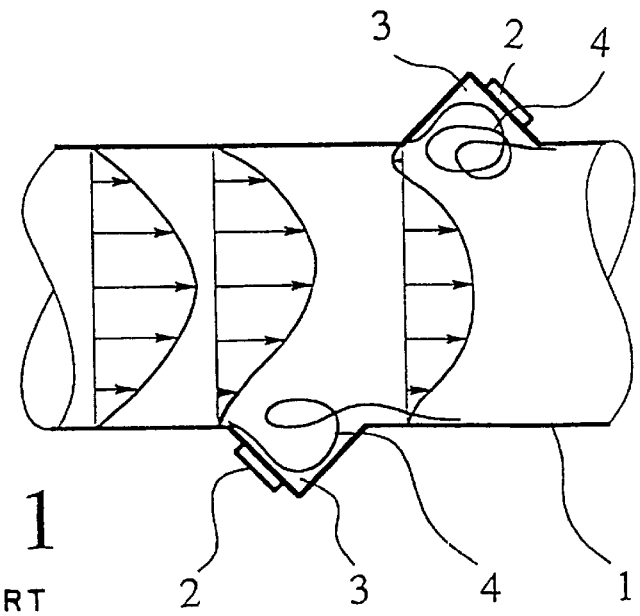
FIG. 1 shows a longitudinal section through a known ultrasonic flowmeter, upon which the invention is based.
Figure 2:
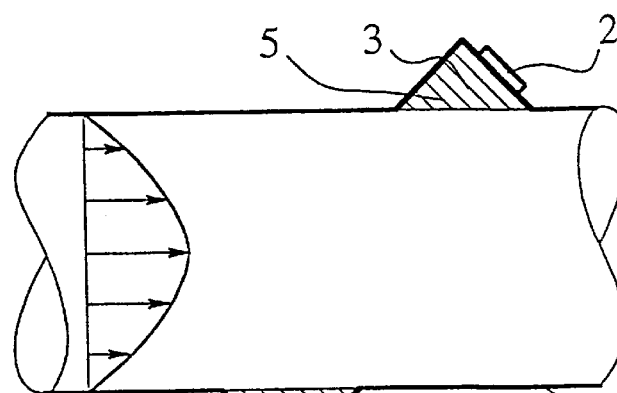
FIG. 2 shows a known ultrasonic flowmeter, in the case of which the transducer pockets are filled with plastic.

As FIG. 1 shows, in the case of the ultrasonic flowmeter shown in this figure, relatively large eddies 4 are formed in the area of the transducer pockets 3. In the case of the known ultrasonic flowmeter shown in FIG. 2, eddies do not appear in the area of the transducer pocket 3, because the transducer pockets 3 are filled with plastic 5. However, this embodiment has the disadvantages and problems described initially, so that it cannot be proved useful in practice.

Figure 3:
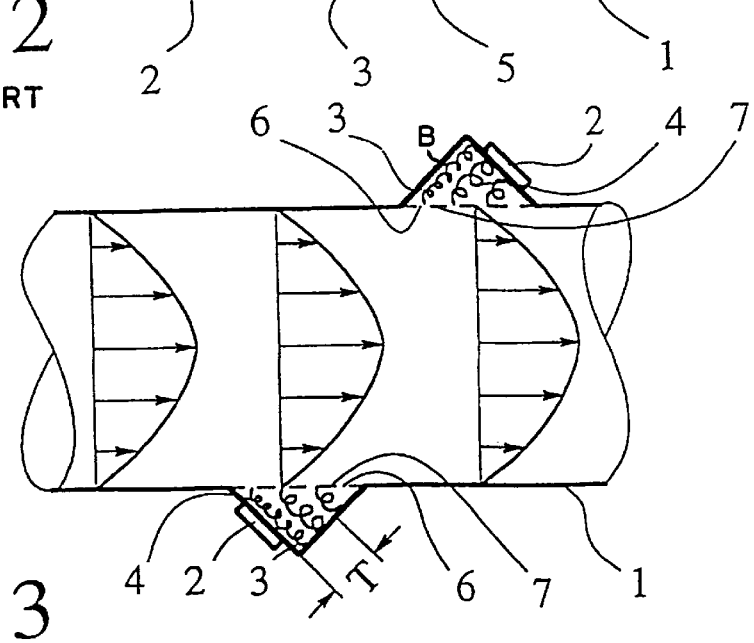
FIG. 3 shows a first embodiment of an ultrasonic flowmeter in accordance with the invention.
Figure 4:
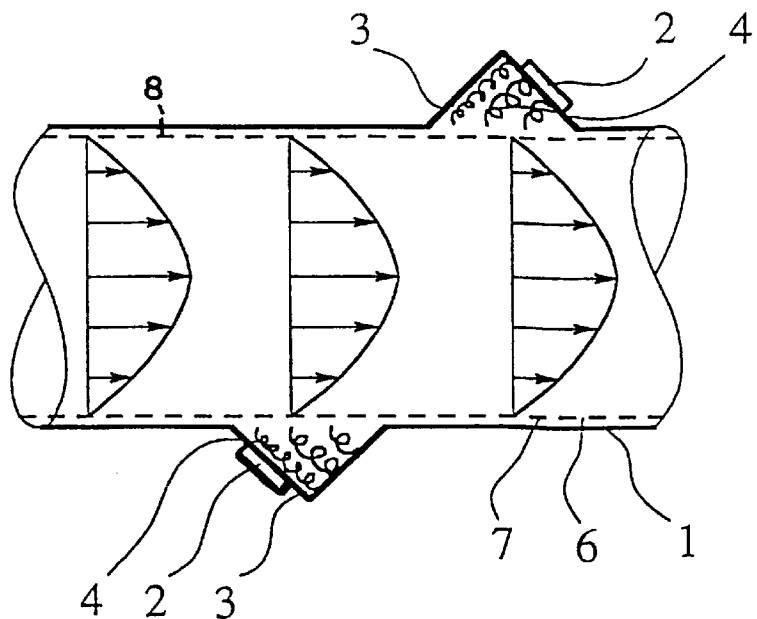
FIG. 4 shows a second embodiment of an ultrasonic flowmeter in accordance with the invention.

Ultrasonic flowmeters designed in accordance with the invention are shown in FIGS. 3 and 4. In the embodiment shown in FIG. 3, the transducer pockets 3, and indeed only the transducer pockets 3, are provided on the entrance side with a grid 7 having meshes 6. As compared with this, FIG. 4 shows an embodiment of the ultrasonic flowmeter in accordance with the invention, whose measuring tube 1 is provided with a continuous grid 7 on its inside 8; consequently the measuring tube 1 as a whole is provided with a grid 7.

As already stated, the grid 7 provided in accordance with the invention has to be ultrasonically transparent. This is assured when the meshes 6 of the grid 7 have mesh or braid bars B (FIG. 3), which are smaller, i.e., shorter, than the square root of the product of the average depth T of the transducer pockets and the wavelength λ of the ultrasound in the flowing medium, i.e., $F<\sqrt{T\lambda}$.

In particular, there are different possibilities for choosing the geometry of the meshes 6 of the grid 7, which are not shown in detail in the figures. Thus, the meshes 6 of the grid 7 can have a circular or an elliptical cross-section. Then, the diameter of the meshes 6 of the grid 7 is chosen so that it lies between the wavelength λ of the ultrasound in the flowing medium and twice this wavelength. The meshes 6 of the grid 7 can also have a rectangular, in particular a square, or even a rhombic cross-section. For the dimensioning of the meshes 6 of the grid 7 in that case, it obtains that the side lengths of the meshes 6 are equal to the wavelength λ of the ultrasound in the flowing medium or greater than this wavelength, but preferably are smaller than double the wavelength λ. Finally, the meshes 6 of the grid 7 may also have a triangular, polygonal, or star-shaped cross-section. Then it obtains for the dimensioning of the meshes 6 that the diameter of the circle enclosed by the meshes 6 of the grid 7 is equal to the wavelength λ of the flowing medium or greater than this wavelength, but preferably is smaller than double the wavelength λ.

A comparison of FIGS. 3 and 4 with FIG. 1 shows that, in the case of the ultrasonic flowmeter in accordance with the invention, the eddies 4 are considerably smaller than the eddies 4 in the case of the ultrasonic flowmeter belonging to the prior art, shown in FIG. 1. Moreover, as stated, the frequency of the eddies 4 in the case of the ultrasonic flowmeter in accordance with the invention is significantly greater than the frequency of the eddies 4 in the case of the known ultrasonic flowmeter shown in FIG. 1. Thus the time constant is significantly reduced, for example by a factor of 10, and the measurement accuracy, and indeed both the linearity as well as the reproducibility, are significantly improved. Finally, the ratio of the measuring signal to the noise signal also is improved.

Figure 5:
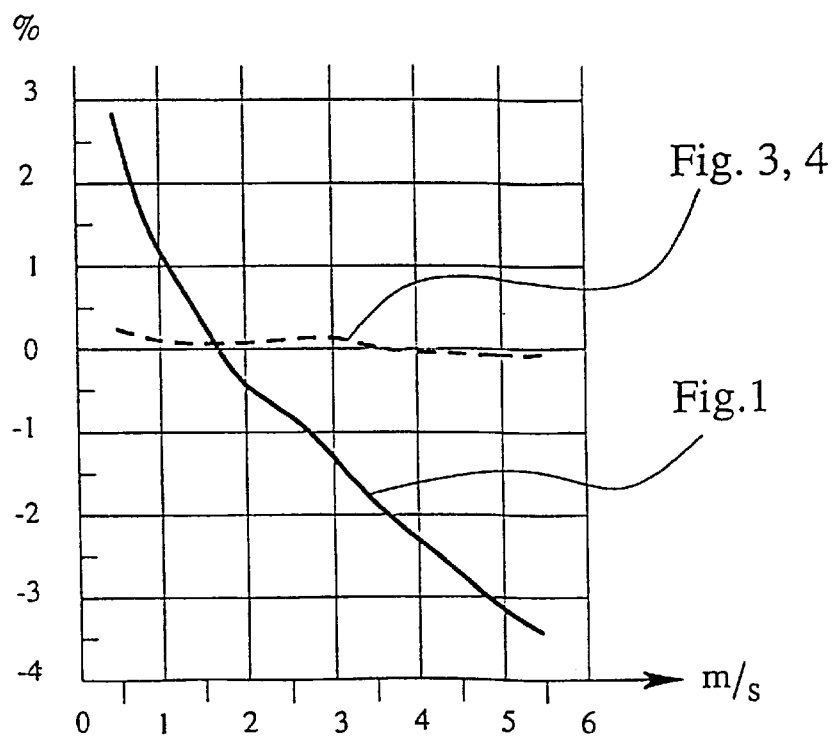
FIG. 5 shows a graphic representation for the explanation of what has been obtained by means of the teaching of the invention.

FIG. 5 shows the dependence of the measurement error on the speed of the flowing medium, and in particular, on the one hand, for the known ultrasonic flowmeter shown in FIG. 1, and, on the other hand, for the flowmeter in accordance with the invention, shown in FIGS. 3 and 4. It is readily seen that in the case of the known flowmeter, the measurement error depends greatly on the speed of the flowing medium, and is relatively great, while in the case of the ultrasonic flowmeter in accordance with the invention, there is an altogether markedly smaller measurement error, barely dependent on the speed of the flowing medium.

Finally, it also is to be noted that the relatively small eddies 4 appearing in the case of the ultrasonic flowmeter in accordance with the invention not only can barely disturb the measurement procedure, but even can provide a positive contribution to the long-term functional capacity of the ultrasonic flowmeter in accordance with the invention, namely in so far as the eddies 4 lead to the fact that the grid 7 is always continuously cleaned; therefore the meshes 6 of the grid 7 remain ultrasonically transparent.

What is claimed is:

1. An ultrasonic flowmeter for flowing media, with a measuring tube and with at least one ultrasonic transducer that produces an ultrasonic signal, the ultrasonic transducer being installed with contact with the flowing medium in a transducer pocket of the measuring tube, said pocket having an entrance side, wherein the measuring tube (1) is provided on an inner side (8) with a continuous grid (7) having a mesh such that the grid (7) covers the entire inner side of the measuring tube (1) including the entrance side of the transducer pocket (3) so that the inner side (8) of the measuring tube (1) has a uniform roughness thereby minimizing eddies in, and stabilizing the flow of, the flowing medium.

2. The ultrasonic transducer in accordance with claims 1, wherein the mesh (6) of the grid (7) has a circular or an elliptical cross-section.

3. The ultrasonic flowmeter in accordance with claim 2, wherein the diameter of the mesh (6) of the grid (7) is between the wavelength of the ultrasonic signal in the flowing medium and twice the wavelength of said ultrasonic signal.

4. The ultrasonic flowmeter in accordance with claims 1, wherein the mesh (6) of the grid (7) has a rectangular, a square or a rhombic cross-section.

5. The ultrasonic flowmeter in accordance with claim 4, wherein the side length of the mesh (6) of the grid (7) is identical to or greater than the wavelength of said ultrasonic signal in the flowing medium, but is smaller than twice said wavelength.

6. The ultrasonic flowmeter in accordance with claims 1, wherein the mesh (6) of the grid (7) has a triangular, polygonal, or star-shaped cross-section.

7. The ultrasonic flowmeter in accordance with claim 6, wherein the diameter of the circle enclosed by the mesh (6) of the grid (7) is identical to or greater than the wavelength of the ultrasonic signal in the flowing medium, but is smaller than twice said wavelength.

\* \* \* \* \*